United States Patent [19]
Okuda et al.

[11] Patent Number: 6,094,943
[45] Date of Patent: Aug. 1, 2000

[54] TOUGHENED GLASS SHEET

[75] Inventors: Katsuji Okuda, Karasu; Shinichi Kita; Masahide Ishibashi, both of Matsusaka, all of Japan

[73] Assignee: Central Glass Company, Limited, Japan

[21] Appl. No.: 09/104,361

[22] Filed: Jun. 25, 1998

Related U.S. Application Data

[62] Division of application No. 08/773,849, Dec. 27, 1996, abandoned.

[30] Foreign Application Priority Data

Dec. 28, 1995 [JP] Japan .................................. 7-342599

[51] Int. Cl.[7] .................................................. C03B 27/00
[52] U.S. Cl. .............................. 65/114; 65/104; 65/115
[58] Field of Search ...................... 428/441, 410, 428/426, 332, 425.6, 34.4, 220; 65/114, 104, 115

[56] References Cited

U.S. PATENT DOCUMENTS

| | | | |
|---|---|---|---|
| 4,662,926 | 5/1987 | Aratani et al. | 501/70 |
| 4,735,646 | 4/1988 | Aratani et al. | 65/114 |
| 5,112,377 | 5/1992 | Aratani | 65/114 |
| 5,127,932 | 7/1992 | Aratani | 65/114 |
| 5,362,689 | 11/1994 | Morimoto et al. | 501/70 |

FOREIGN PATENT DOCUMENTS

| | | |
|---|---|---|
| 0 000 268 A1 | 1/1979 | European Pat. Off. . |
| 0 000 269 A1 | 1/1979 | European Pat. Off. . |
| 0 128 842 | 12/1984 | European Pat. Off. . |
| 0 128 842 A1 | 12/1984 | European Pat. Off. . |
| 0 134 172 | 3/1985 | European Pat. Off. . |
| 0 134 172 A1 | 3/1985 | European Pat. Off. . |
| 92 454 | 5/1967 | France . |
| 2 342 946 | 9/1977 | France . |
| 52-12160 | 10/1977 | Japan . |
| 52-121620 | 10/1977 | Japan . |
| 54-33517 | 3/1979 | Japan . |
| 60-103043 | 6/1985 | Japan . |
| 60-145921 | 8/1985 | Japan . |
| 62-38289 | 8/1987 | Japan . |
| 62-47819 | 10/1987 | Japan . |
| 62-50416 | 10/1987 | Japan . |
| 62-51212 | 10/1987 | Japan . |
| 63-43327 | 8/1988 | Japan . |
| 3-228841 | 10/1991 | Japan . |
| 4-29615 | 5/1992 | Japan . |
| 4-60059 | 9/1992 | Japan . |
| 6-2593 | 1/1994 | Japan . |
| 6-23068 | 3/1994 | Japan . |
| 6-24995 | 4/1994 | Japan . |
| 6-102557 | 12/1994 | Japan . |
| 1157391 | 7/1969 | United Kingdom . |
| 2 232 978 | 1/1991 | United Kingdom . |
| 95/04708 | 2/1995 | WIPO . |

OTHER PUBLICATIONS

JIS R 3222, 1996, "Heat Strengthened Glass" (Japan—no English translation).
JIS R 3211, 1992, "Safety Glass for Road Vehicles" (in English and Japanese).
JIS R 3212, 1992, "Test Method of Safety Glass for Road Vehicles" (in English and Japanese).

*Primary Examiner*—Deborah Jones
*Assistant Examiner*—Abraham Bahta
*Attorney, Agent, or Firm*—Evenson, McKeown, Edwards & Lenahan, P.L.L.C.

[57] ABSTRACT

A toughened glass sheet for use as a windowpane of an automotive vehicle. The toughened glass sheet has a thickness ranging from 2.5 mm to 3.1 mm and has a first characteristic that a number of fragments is not less than 40 within an area of 50 mm×50 mm in a fragmentation test in which an impact is applied to a predetermined position of the glass sheet with a hammer or a punch, and a second characteristic that a specified height is not less than 2 m in an impact resistance test in which the specified height is a value at which the glass sheet is broken upon dropping a steel ball having a weight of 227 g.

2 Claims, No Drawings

TOUGHENED GLASS SHEET

This application is a division of application Ser. No. 08/773,849, filed Dec. 27, 1996, abandoned.

BACKGROUND OF THE INVENTION

1. Field of the Invention

This invention relates to improvements in a toughened glass sheet which has a thickness of, for example, from 2.5 to 3.1 mm and is tempered by air-cooling in order to provide a toughened glass sheet high in tempered degree and suitable for architectural windowpanes and automotive vehicle windowpanes.

2. Description of the Prior Art

Hitherto a variety of methods of toughening or tempering a glass sheet having a thickness ranging, for example, from 2.5 mm to 3.5 mm by air-cooling have been proposed and put into practical use in order to obtain a toughened glass sheet. One of them is disclosed in Japanese Patent Provisional Publication No. 52-121620 which describes a glass sheet and a method of producing it. The glass sheet is used as a side windowpane and a rear windowpane of an automotive vehicle and locally chilled so that regions low in tempered degree are distributed among regions high in tempered degree. The average central tensile stress of the glass sheet is set within a range of from the maximum value of 62 $MN/m^2$ in all glass sheets having a thickness of 2.5 to 3.5 mm to the minimum value of 56.5 $MN/m^2$ in a glass sheet having a thickness of 2.5 mm or the minimum value of 53 $MN/m^2$ in the glass sheet having a thickness of 3.5 mm upon being changed inversely with the thickness. Regions uniform in principal stress to be applied in flat plane of the glass sheet are distributed throughout the glass sheet, in which the maximum value of principal stress difference in at least some of the above regions are fallen within a range of from 8 to 25 $MN/m^2$. Accordingly, almost all principal stresses in regions adjacent the regions exhibiting the maximum value of the principal stress difference are directed in a variety of directions, in which the distance between the centers of the adjacent regions is within a range of from 15 to 30 mm.

Another one is disclosed in Japanese Patent Provisional Publication No. 54-33517 which describes a method of toughening a glass sheet and a toughened glass sheet produced thereby. In this method, tempering gas stream is a single local gas stream which is pulsed at a repeated frequency in connection with a velocity at which the glass sheet is carried to a tempering station thereby forming highly tempered regions distributed in a lowly tempered regions. Additionally, gas jets are directed to cross the moving direction of the glass sheet and arranged separate from each other in which gas stream of each gas jet is pulsed, thus applying many local gas stream to the glass sheet.

A further one is disclosed in Japanese Patent Provisional Publication No. 60-145921 which describes a method of toughening a glass sheet and an apparatus therefor. In this method, gas is blown to the opposite surfaces of a glass sheet thereby tempering the glass sheet, in which the maximum pressure drop of gas occurs at the free end of the nozzle. Additionally, this Publication describes the following techniques: The gas is supplied to the nozzle at a flow velocity which becomes at least sonic velocity at the outlet of the nozzle. The end of the nozzle is disposed close to the glass sheet and located within such a distance from the glass sheet as to be 6 times the diameter (width) of the gas jet stream at the outlet of the nozzle. The nozzles are arranged in such a pattern that the distance among the nozzles is shorter at the starting part of the tempering station in the moving or longitudinal direction of the glass sheet than that at the terminal part of the tempering station. The amount of gas to be blown to the glass sheet is larger at the starting part of the tempering station than that of the other parts of the tempering station. Throttle nozzles are used to enable air to be ejected at sonic velocity.

A further one is disclosed in Japanese Patent Provisional Publication No. 60-103043 which describes a method of toughening a glass sheet and an apparatus therefor. In this method, ejection steam of fluid is blown from nozzles to at least one surface of the glass sheet thereby tempering the glass sheet, in which gas is supplied to the nozzle at a velocity which allows the gas to flow at at least sonic velocity at the outlet of the nozzle. The above ejection stream is a mixture of the gas and sprayed liquid. Additionally, this Publication describes that the liquid is atomized by being supplied to impulse wave generated inside the nozzle.

Further ones have also proposed by the same group as the inventors of the present invention of this application. One of them is disclosed in Japanese Patent Publication No. 62-50416 (U.S. Pat. No. 4,662,926) which describes a method of toughening a glass sheet. In this method, cooling nozzles of a blast head are arranged as follows: A single center of concentrical circles is set at a nozzle installation face of the blast head, and the cooling nozzles are located along the concentrical circles and aligned radially in which the distance among the nozzles are not larger than 50 mm. Cooling medium is blown from the thus arranged cooling nozzles onto the glass sheet thereby tempering the glass sheet.

The same group have further proposed similar methods similar to that of Japanese Patent Publication No. 62-50416, as disclosed, for example, in Japanese Patent Publication No. 62-38289, Japanese Patent Publication No. 62-47819, Japanese Patent Publication No. 62-51212, and Japanese Patent Publication No. 63-43327. Now, Japanese Patent Publication No. 62-38289 describes that at least one of a pair of pressing dies is provided with heating elements which are arranged to concentrically spread throughout a range of from the center to the outside. Japanese Patent Publication No. 62-47819 describes that a plurality of baffle plates are arranged to concentrically spread throughout a range of from the center toward the outside of the cooling nozzle installation surface of the blast head. Japanese Patent Publication No. 62-51212 describes that at least one of a pair of pressing dies is provided with cooling elements which are arranged to concentrically spread throughout a range of from the center toward the outside so as to conduct a preliminary cooling, and then quenching the glass sheet by blowing a cooling medium to the glass sheet. Japanese Patent Publication No. 63-43327 describes that cooling nozzles are arranged along concentric circles and to concentrically spread throughout a range of from the center toward the outside of the cooling nozzle installation surface of the blast head, in which the cooling nozzles other than the center cooling nozzle are arranged such that their axes are inclined 3 to 45° in a tangential direction of the concentric circles relative to a vertical axis which is perpendicular to the blast head surface in order to quench the glass sheet.

The same group has proposed a further glass sheet toughening method as disclosed in Japanese Patent Publication No. 4-29615 (U.S. Pat. No. 4,735,646) which describes the following technique: In tempering a glass sheet having a thickness of, for example, 1.5 to 3.0 mm, the pressure of cooling air is rapidly lowered from a gauze pressure of 2 to 8 kg/cm² to a gauze pressure of 0.05 to 0.5 kg/cm² to be fed into an air chamber, upon which the glass sheet is quenched by using like a shock tube a range of from the inside of the air chamber to the tip end of the cooling nozzle. The cooling air is generated by an air compressor.

Furthermore, the same group has proposed similar techniques as disclosed in Japanese Patent Publication No. 6-2593, Japanese Patent Publication No. 6-23068 (British Patent No. 2,232,978), Japanese Patent Publication No. 624995 (U.S. Pat. No. 5,112,377), and Japanese Patent Provisional Publication No. 3-228841 (U.S. Pat. No. 5,127, 932). Now, Japanese Patent Publication No. 6-2593 describes a heat treatment method for glass articles, in which the pressure of cooling air is rapidly lowered from a gauze pressure of 1.5 to 8 kg/cm² to a gauze pressure of 0.01 to 0.2 kg/cm² to be fed into an air chamber. In this process, the glass article is quenched by using like a shock tube a range of from the inside of the air chamber to the tip end of the cooling nozzle, and additionally cooling is gradually made from the central part to the peripheral part of the glass article with a time lag. Japanese Patent Publication No. 6-23068 describes a two-stage cooling technique in which air (generating shock wave) having a heat transfer coefficient of 300 to 1000 kcal/m²·h·°C. is blown to a glass article, and thereafter air having a heat transfer coefficient of 100 to 300 kcal/m²·h·°C. is blown to the glass article. Japanese Patent Publication No. 6-24995 describes that quenching a glass sheet is accomplished with nozzles $N_C$ connected to an air compressor and nozzles $N_B$ connected to a blower, in which cooling air from the nozzles $N_C$ to be blown to the glass sheet to be tempered contains air exhibiting shock wave, and the pressure of the nozzles $N_B$ and the pressure of the nozzles $N_C$ are in a relation of $0<(P_B-P_C)\leq 500$ mmAq. Japanese Patent Provisional Publication No. 3-228841 describes that after a preliminary cooling is made by blowing air in a stripes pattern whose stripes has an inclination of $\theta$ ($45°<\theta\leq 90°$) relative to the moving direction of the glass sheet, cooling medium is blown to quench the glass sheet.

However, difficulties have been encountered in the above conventional techniques, as set forth below. The glass sheets according to Japanese Patent Provisional Publication No. 52-121620 and Japanese Patent Provisional Publication No. 54-33517 are insufficient in strength as a windshield or windowpane of an automotive vehicle. They are assumed to meet some requirements of automotive glass test standards, such as the number of fragments and no existence of sharp edge having a length not less than 100 mm in a fragmentation test. However, they are difficult to securely meet the requirements of the height of not less than 2 m in an impact resistance test. The above Publication does not describe such an impact resistance.

According to Japanese Patent Provisional Publication Nos. 60-145921 and 60-103043, the cooling rate of the glass sheets is increased to enhance the tempering by producing the sonic velocity air ejection or the impulse wave. These glass sheets are difficult to securely meet the requirements of automotive glass test standard, for example, of the height of not less than 2 m in the impact resistance test. Such an impact resistance is not described in these Publications.

Additionally, according to the glass sheet toughening methods proposed by the same group as the present inventors and disclosed in Japanese Patent Publication Nos. 62-38289 and 4-29615, the glass sheets are tempered by providing difference in cooling to the glass sheet in a concentric manner or by cooling the glass sheet in a shock tube manner. By these tempering, the glass sheets can be largely improved so as to meet the requirements of the automotive glass test standard, for example, the number of fragments, no production of sharp edge having a length exceeding 100 mm, and no production of fragment having an area of not less than 3 cm² in the fragmentation test. However, concerning the impact resistance test, the glass sheets according to the Publications are improved so as to meet the requirements of automotive glass test standard of the height ranging from 1.5 to 2 m but cannot meet the requirement of the height of not less than 2 m.

SUMMARY OF THE INVENTION

It is an object of the present invention to provide an improved toughened glass sheet which can effectively overcome drawbacks encountered in conventional toughened glass sheets produced according to a variety of methods, particularly disclosed in the above-discussed Patent Publications.

Another object of the present invention is to provide an improved toughened glass sheet which is high in safety and light in weight and suitable for use as architectural window glasses or windowpanes and automotive vehicle windowpanes.

A further object of the present invention is to provide an improved toughened glass sheet which has a thickness, for example, ranging from 2.5 to 3.1 mm and meet the requirements of automotive glass test standards of, for example, a specified value of the number of fragments, no production of a specified sharp edge, an area of fragment being not less than a specified value, and the like.

A still further object of the present invention is to provide an improved toughened glass sheet which is produced by a method which is improved in cooling manner over the production methods disclosed in a variety of Patent Publications.

An aspect of the present invention resides in a toughened glass sheet which has a first characteristic that a number of fragments is not less than 40 (pieces) within an area of 50 mm×50 mm in a fragmentation test in which an impact is applied to a predetermined position of the glass sheet with one of a hammer and a punch; and a second characteristic that a specified height is not less than 2 m in an impact resistance test in which the specified height is a value at which the glass sheet is broken upon dropping a steel ball having a weight of 227 g.

Another aspect of the present invention resides in a side windowpane glass sheet of an automotive comprising means exhibiting a first characteristic that a number of fragments is not less than 40 (pieces) within an area of 50 mm×50 mm in a fragmentation test in which an impact is applied to a predetermined position of the glass sheet with one of a hammer and a punch; and means exhibiting a second characteristic that a specified height is not less than 2 m in an impact resistance test in which the specified height is a value at which the glass sheet is broken upon dropping a steel ball having a weight of 227 g.

A further aspect of the present invention resides in a rear windowpane glass sheet of an automotive vehicle, comprising: means exhibiting a first characteristic that a number of fragments is not less than 40 (pieces) within an area of 50 mm×50 mm in a fragmentation test in which an impact is applied to a predetermined position of the glass sheet with one of a hammer and a punch; and means exhibiting a second characteristic that a specified height is not less than 2 m in an impact resistance test in which the specified height is a value at which the glass sheet is broken upon dropping a steel ball having a weight of 227 g.

A further aspect of the present invention resides in a method of toughening a glass sheet, comprising the following steps: (a) heating the glass sheet at a temperature ranging from 645 to 660° C.; (b) locating the heated glass sheet between upper and lower blast heads each having a plurality of air ejection nozzles which face the glass sheet; (c) adjusting a distance between the tip ends of the air ejection nozzles of the upper blast head and the tip ends of the air ejection nozzles of the lower blast head within a range of from 75 to 80 mm; (d) adjusting a distance between the adjacent air ejection nozzles within a range of from 20 to 30 mm; (e) ejecting air from the air ejection nozzles only onto the glass sheet; (f) adjusting an amount of air to be ejected from each air ejection nozzle within a range of from $7.0 \times 10^{-4}$ to $10.0 \times 10^{-4}$ Nm$^3$/sec; and (g) adjusting a wind pressure of air ejected from each air ejection nozzle within a range of from 4.0 to 6.0 kg/cm$^2$.

According to the present invention, the toughened glass sheet is sufficient in strength and safety to meet automotive vehicle glass standards. Accordingly, it is made possible to use the toughened glass sheet in the state of a single sheet as a windowpane of an automotive vehicle, which is in epoch-making event in the field of toughened glass sheets. It is a matter of course that the toughened glass sheet of the present invention is used as architectural windowpanes. The toughened glass sheet of the present invention can be used as automotive vehicle windowpanes including a variety of functioning glass sheets such as glass sheets having an ability of cutting infrared rays and/or ultraviolet, rays, coated glass sheets, colored glass sheets, composite glass sheets, single glass sheets, laminated glass sheets, double-layer glass sheets, and curved glass sheets. Additionally, the toughened glass sheet of the present invention is safe for human and advantageous from the standpoint of environmental protection while contributing to a weight-lightening of the automotive vehicle. Furthermore, such a toughened glass sheet can be effectively and readily produced without making any significant structural changes to conventional production facilities for toughened glass sheets.

DETAILED DESCRIPTION OF THE INVENTION

According to the present invention, a toughened glass sheet has a first characteristic that a number of fragments is not less than 40 (pieces) within an area of 50 mm×50 mm in a fragmentation test in which an impact is applied to a predetermined position of the glass sheet with one of a hammer and a punch, and a second characteristic in which a specified height is not less than 2 m in an impact resistance test in which the specified height is a value at which the glass sheet is broken upon dropping a steel ball having a weight of 227 g.

The fragmentation test is conducted as follows: The impact is applied to the predetermined position of the glass sheet (specimen) with a hammer or a punch having a predetermined pointed end. After the glass sheet is broken, the number of fragments of glass are counted in a counting frame of 50 mm×50 mm. Additionally, the number of sharp edges (long and slender fragments) of glass having a length not less than 75 mm is counted. Further, the number of fragments having an area exceeding 3 cm$^2$ is counted. This fragmentation test is according to JIS (Japanese Industrial Standard) R 3212 (Test Method of Safety Glass for Road Vehicles).

The impact resistance test is conducted as follows: The glass sheet (specimen) is placed in a supporting frame having predetermined dimensions. Then, a steel ball having the weight of 227 g at a standstill is dropped from the height (specified height) of 2 m onto the center of the glass sheet to judge as to whether the glass sheet has been broken or not. If not broken, it is judged that the glass sheet has the specified height of not less than 2 m. This impact resistance test is according to JIS R 3212.

As stated above, the toughened glass sheet of the present invention has the first characteristic that the number of the fragments in the fragmentation test is not less than 40 (pieces) within the area of 50 mm×50 mm. Additionally, the toughened glass sheet of the present invention has the second characteristic that the specified height in the impact resistance test is not less than 2 m. With these characteristics, a windowpane or windshield of an automotive vehicle can securely obtain a sufficient strength and safety for human and article. If the number of the fragments is less than 40 (pieces) within the range of 50 mm×50 mm, the glass sheet is insufficient in degree of toughening or tempering, and therefore is insufficient in strength so as not to be ensured in safety. Such a glass sheet is not suitable for the windowpane or windshield of the automotive vehicle. In this regard, the number of fragments in the fragmentation test is preferably within a range of from 40 to 450 (pieces) within the area of 50 mm×50 mm, and more preferably within a range of from 40 to 400 (pieces) within the area of 50 mm×50 mm. Additionally, in order to obtain a sufficient impact resistance and ensure safety of the glass sheet of the automotive vehicle windowpane or windshield, it is necessary that the specified height in the impact resistance test is not less than 2 m. If the specific height is less than 2 m, the glass sheet is not suitable for the automotive vehicle windowpane or windshield from the standpoint of safety.

The toughened glass sheet of the present invention is toughened or tempered under a heat treatment of air-cooling. More specifically, the toughened glass sheet of the present invention is produced by a method which has been attained by applying improvements to a variety of production methods which have been already proposed by the same group as the present inventors and disclosed, for example, in Japanese Patent Publication No. 62-50416 (U.S. Pat. No. 4,662,926), Japanese Patent Publication No. 6-238289, Japanese Patent Publication No. 62-47819, Japanese Patent Publication No. 62-51212, and Japanese Patent Publication No. 63-43327, Japanese Patent Publication No. 4-29615 (U.S. Pat. No. 4,735,646), Japanese Patent Publication No. 6-2593, Japanese Patent Publication No. 6-23068 (British Patent No. 2,232,978), Japanese Patent Publication No. 6-24995 (U.S. Pat. No. 5,112,377), and Japanese Patent Provisional Publication No. 3-228841 (U.S. Pat. No. 5,127,932).

Additionally, the improvements of the production method for the toughened glass sheet of the present invention relate to the heat treatment or tempering (by air cooling) which is carried out by a cooling apparatus or system as disclosed, for example, in Japanese Patent Application No. 7-105623 (U.S. patent application No. 08/637,840).

It is preferable that the toughened glass sheet of the present invention has a third characteristic that no sharp edge of glass having a length of not less than 75 mm is produced in the fragmentation test, and has a fourth characteristics that no fragment of glass having an area not less than 3 cm$^2$ is produced in the fragmentation test. These characteristics are necessary for a windowpane or windshield of an automotive vehicle from the view points of attaining a sufficient strength and safety for human and article. In this regard, it will be appreciated that it is the most preferable that the toughened glass sheet has the characteristics in which the number of fragments is not smaller than 40 (pieces) within the area of 50 mm×50 mm in the fragmentation test in which an impact is applied to the predetermined position of the glass sheet with the hammer and the punch; the specified height is not less than 2 m in an impact resistance test in which the specified height is the value at which the glass sheet is broken upon dropping the steel ball having the weight of 227 g; no sharp edge of glass having the length of not less than 75 mm is produced in the fragmentation test; and no fragment of glass having an area not less than 3 cm² is produced in the fragmentation test. The above characteristic that no sharp edge of glass having the length of not less than 75 mm is particularly preferable to lighten human damage.

It is sufficiently possible that the above characteristics are provided to a curved glass sheet having a radius of curvature of, for example, 1250 mm. It will be understood that suitable adjustments may be made to be provided to the glass sheet upon taking accounting of a variety of factors, for example, thickness, radius of curvature, kinds of glass such as a green-colored glass having an ability of absorbing infrared rays and ultraviolet rays, and the like. In case of automotive glass windshield and windowpane, it is preferable to have a surface compressive stress ranging from 1300 kg/cm² to 1500 kg/cm², and a variation in radius of curvature, not more than 1.5 mm.

Furthermore, the toughened glass sheet of the present invention has a thickness preferably ranging from 2.5 mm to 3.1 mm, more preferably ranging from 2.5 to 3.0 mm. Additionally, it is preferable that the toughened glass sheet of the present invention is made of colorless or colored glass, in which it is further preferable that the glass is a green-colored glass having an ability of absorbing infrared and ultraviolet rays or a readily temperable clear glass which has been proposed, for example, by the same group as the present inventors and is disclosed in Japanese Patent Publication No. 4-60059. Such a glass is preferable in physical properties which depend on the composition thereof. Furthermore, it is preferable that the glass of the toughened glass sheet is an available green-colored glass having an ability of absorbing infrared and ultraviolet rays, or a green-colored glass having an ability of absorbing infrared and ultraviolet rays, as proposed by the same group as the present inventors and disclosed in Japanese Patent Publication No. 6-102557 (U.S. Pat. No. 5,362,689). However, it will be appreciated that the principle of the present invention is not limited in application to glass sheets of the above kinds, colors and/or the like and therefore is applicable to a variety of flat glass sheets and single glass sheets and also applicable to multiple layer glass sheets and laminated glass sheets in which the principle is applied to a par or a whole body thereof. Additionally, the principle of the present invention may be applied to a variety of plate or sheet members.

As appreciated from the above, according to the present invention, the toughened glass sheet has the first characteristic that the number of fragments is not smaller than 40 (pieces) within the range of 50 mm×50 mm in the fragmentation test in which an impact is applied to a predetermined position of the glass sheet with the hammer or the punch; and a specified height is not less than 2 m in the impact resistance test in which the specified height is the value at which the glass sheet is broken upon dropping the steel ball having a weight of 227 g. Such a glass sheet is suitable for an automotive windshield or windowpane, particularly for side and rear windowpanes of an automotive vehicle, exhibiting a sufficient strength and durability and sufficient safety while contributing to weight-lightening of the automotive vehicle. Further, such a glass sheet can be produced very effectively to provide a high quality, and therefore is suitable for use not only as architectural window glass or windowpanes but also as automotive vehicle windshields and windowpanes.

The invention will be understood more readily with reference to the following examples; however, these examples are intended to illustrate the invention and are not to be construed to limit the scope of the invention.

EXAMPLES

First, glass sheets were produced from a glass material (a green-colored glass having an ability of absorbing infrared and ultraviolet rays) which was suitable for an automotive windshield or windowpane. The produced glass sheets had a thickness of about 2.8 mm and a size of about 400 mm×about 200 mm. The glass sheets were then subjected to a bending and tempering process which was accomplished using each of a variety of bending and tempering systems (in which bending was made, for example, under the action of the weight of the glass sheet itself) and according to each of a variety of methods as disclosed in Japanese Patent Publication No. 62-50416 (U.S. Pat. No. 4,662,926), Japanese Patent Publication No. 62-38289, Japanese Patent Publication No. 62-47819, Japanese Patent Publication No. 62-51212, and Japanese Patent Publication No. 63-43327, Japanese Patent Publication No. 4-29615 U.S. Pat. No. 4,735,646), Japanese Patent Publication No. 6-2593, Japanese Patent Publication No. 6-23068 (British Patent No. 2,232,978), Japanese Patent Publication No. 6-24995 (U.S. Pat. No. 5,112,377), and Japanese Patent Provisional Publication No. 3-228841 (U.S. Pat. No. 5,127,932), and further Japanese Patent Application No. 7-105623 (U.S. patent application No. 08/637,840). Thus, a plurality of glass sheets (specimens) to be tempered were prepared.

At a tempering step in the bending and tempering process, each glass sheet or specimen which had been heated was located between upper and lower blast heads which were disclosed in some of the above-discussed patent publications. Each blast head was provided with a plurality of air ejection nozzles for ejecting cooling air onto the surface of the glass sheet. The air ejection nozzles of the upper blast head and the air ejection nozzles of the lower blast head were located on the opposite sides of the glass sheet and face with each other. The air ejection nozzles of each blast nozzle were arranged Such that the tip ends thereof are separate by the generally same distance from the surface of the glass sheet. The tempering was accomplished by blowing cooling air to the glass sheet from the air ejection nozzles of each blast head, thereby obtaining a plurality of the toughened glass sheets each of which has a radius of curvature of about 1800 mm. At this tempering step, the following improvements were made to obtain the glass sheet characteristics of the present invention: (a) The distance between the tip ends of the air ejection nozzles of the upper blast head and the tip ends of the air ejection nozzles of the lower blast head was within a range of from 75 to 80 mm. This distance was reduced 10 to 15% of that in conventional techniques disclosed in the above patent publications in which the same distance was about 90 mm. (b) Ejection of air from the air ejection nozzles were made only onto the opposite surfaces of the glass sheet so that no air ejection was made onto other jigs (metal dies and carrying jigs) and the like. (c) The distance between the adjacent air ejection nozzles were within a range of from 20 to 26 mm, preferably 22 to 26 mm in case that each nozzle had an air ejection opening whose diameter is, for example, 1.5 mm. (d) The amount of air ejected from each air ejection nozzle was within a range of $7.0 \times 10^{-4}$ to $10.0 \times 10^{-4}$ Nm$^3$/sec, preferably $9.2 \times 10^{-4}$ to $10.0 \times 10^{-4}$ Nm$^3$/sec or $7.3 \times 10^{-4}$ to $8.4 \times 10^{-4}$ Nm$^3$/sec. (e) The wind pressure (standard value) of air ejected from each air ejection nozzle was within a range of from 4.0 to 6.0 kg/cm$^2$, preferably 4.5 to 5.5 kg/cm$^2$. An allowable error in wind pressure was within 3% of the standard value. (f) The glass sheet as heated was rapidly chilled so as to increase the temperature difference between the heated glass sheet and the cooled glass sheet. In this regard, the glass sheet to be tempered was heated to a temperature within a range from 645 to 660° C. which was higher about 30° C. than that in the conventional techniques disclosed in the above patent publications.

Each of the thus obtained toughened or tempered glass sheets was then subjected to the fragmentation test and the impact resistance test which were conducted according to JIS (Japanese Industrial Standard) R 3212 (Test Method of Safety Glass for Road Vehicles) and with reference to JIS R 3211 (Safety Glass for Road Vehicle). For these tests, reference was made also on ECE standard (for example, ECE R43), AS standard (for example, FMVSS 205) and the like. In the fragmentation test in which the impact was applied to a predetermined position of the glass sheet with the hammer or the punch, the number of the fragments, the sharp edge condition of the fragments, and the area of each fragment and the number of the fragments having area exceeding a predetermined level were measured in order to evaluate the safety of the glass sheet. In the impact resistance test in which the glass sheet is broken upon dropping the steel ball having the weight of 227 g, the specified height at which the glass sheet was broken was measured in order to evaluate the impact resistance of the glass sheet. Additionally, the weight of the largest fragment was also measured in the fragmentation test. Further measurements were made to evaluate the transmittance of visible light, the optical distortion, the double image (secondary image separation) and the like for the toughened glass sheet. A surface compressive stress of the glass sheet was also measured by using a surface stress measuring device FSM-30 produced by Toshiba Glass Co., Ltd. and according to JIS R3222. A warping (variation) depending on the radius of curvature was measured according to JIS R3222.

As a result of the above measurements of the tests, the toughened glass sheets of the present invention meet the requirements of automotive glass standards according to JIS R3211 (Safety Glass for Road Vehicles) and exhibited the following characteristics: The number of fragments is not smaller than 40 (pieces) within the range of 50 mm×50 mm in the fragmentation test in which the impact is applied to the predetermined position of the glass sheet with the hammer or the punch; The specified height is not less than 2 m in the impact resistance test in which the specified height is the value at which the glass sheet is broken upon dropping the steel ball having the weight of 227 g; No sharp edge of glass having the length of not less than 75 mm was produced in the fragmentation test; No fragment of glass having an area not less than 3 cm$^2$ was produced in the fragmentation test; The surface compressive stress was within a range of from 1300 kg/cm$^2$ to 1500 kg/cm$^2$; and The variation (warping) depending on the radius of curvature was not more than 1.5 mm. Thus, the toughened glass sheets produced as discussed above were ones which had been intended according to the present invention.

Besides, the above toughened glass sheets were installed as a side windowpane to an automotive vehicle and subjected to an actual running test. As a result, it was confirmed that the toughened glass sheets were sufficient in durability similarly to conventional side windowpanes, while contributing to weight-lightening of the automotive vehicle.

What is claimed is:

1. A method of toughening a glass sheet, comprising the following steps:

heating the glass sheet at a temperature ranging from 645 to 660° C.;

locating the heated glass sheet between upper and lower blast heads each having a plurality of air ejection nozzles which face the glass sheet;

adjusting a distance between the tip ends of the air ejection nozzles of the upper blast head and the tip ends of the air ejection nozzles of the lower blast head within a range of from 75 to 80 mm;

adjusting a distance between the adjacent air ejection nozzles within a range of from 20 to 30 mm;

ejecting air from the air ejection nozzles only onto the glass sheet;

adjusting an amount of air to be ejected from each air ejection nozzle within a range of from $7.0 \times 10^{-4}$ to $10.0 \times 10^{-4}$ Nm$^3$/sec; and adjusting a wind pressure of air ejected from each air ejection nozzle within a range of from 4.0 to 6.0 kg/cm$^2$.

2. A method of toughening a glass sheet to obtain a toughened glass sheet having a first characteristic that a number of fragments is not less than 40 within an area of 50 mm×50 mm in a fragmentation test in which an impact is applied to a predetermined position of the glass sheet with one of a hammer and a punch; and a second characteristic that a specified height is not less than 2 m in an impact resistance test in which the specified height is a value at which the glass sheet is broken upon dropping a steel ball having a weight of 227 g;

said method comprising:

heating the glass sheet at a temperature ranging from 645 to 660° C.;

locating the heated glass sheet between upper and lower blast heads each having a plurality of air ejection nozzles which face the glass sheet;

adjusting a distance between the tip ends of the air ejection nozzles of the upper blast head and the tip ends of the air ejection nozzles of the lower blast head within a range of from 75 to 80 mm;

adjusting a distance between the adjacent air ejection nozzles within a range of from 20 to 30 mm;

ejecting air from the air ejection nozzles only onto the glass sheet;

adjusting an amount of air to be ejected from each air ejection nozzle within a range of from $7.0 \times 10^{-4}$ to $10.0 \times 10^{-4}$ Nm$^3$/sec; and adjusting a wind pressure of air ejected from each air ejection nozzle within a range of from 4.0 to 6.0 kg/cm$^2$.

* * * * *